United States Patent
Kjeldaas

(10) Patent No.: US 8,724,712 B1
(45) Date of Patent: May 13, 2014

(54) APPARATUS AND METHOD FOR ENCODING AT NON-UNIFORM INTERVALS

(75) Inventor: Alexander Kjeldaas, Stockholm (SE)

(73) Assignee: Google Inc., Mountain View, CA (US)

( * ) Notice: Subject to any disclaimer, the term of this patent is extended or adjusted under 35 U.S.C. 154(b) by 328 days.

(21) Appl. No.: 13/177,669

(22) Filed: Jul. 7, 2011

(51) Int. Cl.
  *H04N 7/12* (2006.01)
  *H04N 11/02* (2006.01)

(52) U.S. Cl.
  USPC ............ 375/240.26; 375/240.01; 375/240.03; 375/240.1; 375/240.16; 375/240.28

(58) Field of Classification Search
  USPC ............. 375/240.01, 240.26, 240.28, 240.03, 375/240.1, 240.16
  See application file for complete search history.

(56) References Cited

U.S. PATENT DOCUMENTS

| | | | | |
|---|---|---|---|---|
| 6,728,315 B2 * | 4/2004 | Haskell et al. | ........... | 375/240.16 |
| 6,785,334 B2 * | 8/2004 | van der Schaar et al. | ........ | 375/240.16 |
| 2006/0114990 A1 * | 6/2006 | Pak | .......................... | 375/240.03 |
| 2009/0187955 A1 * | 7/2009 | Sullivan et al. | ............... | 725/106 |

OTHER PUBLICATIONS

Sakazume. JP2006-180173 JPO Full Text and Abstract Translation. Jul. 2006.*
Yao et al. Scalable Video Coding in a Nutshell. Synthesis Journal, Section Four, 2008, pp. 89-108.*
Hsu et al. Power-Scalable Multi-Layer Halftone Video Display for Electronic Paper. 2008 IEEE International Conference on Multimedia and Expo, 2008, pp. 1445-1448.*
International Telecommunications Union H.264. "Annex G: Scalable video coding." Series H: Audiovisual and Multimedia Systems, Infrastructure of audiovisual services—Coding of moving video, Advanced video coding for generic audiovisual services. Mar. 2010, pp. 407-619.
Wilkins, P. "Real-time video with VP8/WebM." Retrieved from http://webm.googlecode.com/files/Realtime_VP8_2-9-2011.pdf.
Schulzrinne, H. et al. "RTP: A Transport Protocol for Real-Time Applications." Request for Comments (RFC) 3550. The Internet Society, Jul. 2003.
"Series H: Audiovisual and Multimedia Systems; Infrastructure of audiovisual services—Coding of moving video; Advanced video coding for generic audiovisual services". H.264, Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audivisual services". Amendment 1: Support of additional colour spaces and removal of the High 4:4:4 Profile. International Telecommunication Union. Dated Jun. 2006.

(Continued)

*Primary Examiner* — Christopher S Kelley
*Assistant Examiner* — Zhihan Zhou
(74) *Attorney, Agent, or Firm* — Young Basile Hanlon & MacFarlane P.C.

(57) ABSTRACT

A system, apparatus, and method for encoding a plurality of frames in a video stream with temporal scalability. The method includes identifying a non-uniform sequence of time values within a period, determining a frame corresponding to each time value in the non-uniform sequence, within at least one period, and assigning each of the determined frames to one of a plurality of temporal encoding layers.

23 Claims, 5 Drawing Sheets

(56) References Cited

OTHER PUBLICATIONS

"VP6 Bitstream & Decoder Specification". Version 1.02. On2 Technologies, Inc. Dared Aug. 17, 2006.

"Series H: Audiovisual and Multimedia Systems; Infrastructure of audiovisual services—Coding of moving video". H.264. Amendment 2: New Profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

\* cited by examiner

APPARATUS AND METHOD FOR ENCODING AT NON-UNIFORM INTERVALS

TECHNICAL FIELD

The present invention relates in general to video stream encoding and decoding.

BACKGROUND

Digital video streams typically represent video using a sequence of frames (i.e. still images). An increasing number of applications today make use of digital video stream encoding for purposes other than traditional moving pictures (such as movies and video clips). For example, screen capture and screen casting applications generally represent the output of a computer monitor over time as a digital video stream, irrespective of the specialized nature of the content of the monitor. Typically, screen capture and screen casting digital video streams are encoded using video encoding techniques like those used for traditional moving pictures.

To permit transmission of digital video streams while limiting bandwidth consumption, a number of video compression schemes have been devised, including formats such as VPx, promulgated by Google, Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

Various users of digital video streams may require or prefer compressed video at different bitrates (i.e. number of bits per second). One way to adjust the bitrate of a digital video stream is to change the number of frames encoded per second (FPS). In other words, a video stream encoded at 6 FPS may consume less bitrate (also referred to as bandwidth) than a video stream encoded at 12 FPS. In order to encode a video stream once, but still support varying bitrate requirements, existing video compressions schemes allow for encoding of a video stream into multiple layers.

These schemes are limited to a fixed number of layers, for example, three layers. The first layer, or base layer, contains a standalone compressed video stream that encodes the video stream at a low FPS, for example 3 FPS. Successive layers can be combined with the base layer to create a video stream at a higher FPS. The second layer, or intermediate layer contains a compressed video stream at a FPS equal to all of the layers below, in this case, 3 FPS. The intermediate layer, when combined with the base layer, effectively doubles the FPS of the base layer, for a combined FPS of 6. The frames in the intermediate layer are arranged with respect to time to be in between the frames in the base layer. The third layer, or high layer, contains a compressed video stream at a FPS equal to all of the layers below, in this case, 6 FPS. The high layer, combined with the layers below, effectively doubles the FPS of the layers below, for a combined FPS of 12. The frames in the high layer are arranged with respect to time to be in between the frames included in each of the base and intermediate layers.

In other words, these schemes are limited in the sense that they are unable to increment the FPS of a compressed video stream in a granular fashion. Rather, each layer of encoded video doubles the FPS of the layers below, resulting in an exponential increase in FPS as layers are included in the data sent to a user.

SUMMARY

Disclosed herein are embodiments of methods and apparatuses for encoding a video signal.

One aspect of the disclosed embodiments is a method for encoding a plurality of frames in a video stream with temporal scalability. The method includes identifying a non-uniform sequence of time values within a period, determining a frame corresponding to each time value in the non-uniform sequence, within at least one period, and assigning each of the determined frames to one of a plurality of temporal encoding layers.

Another aspect of the disclosed embodiments is a method for encoding a plurality of frames in a video stream. The method includes encoding at least some of the plurality of frames at non-uniform time intervals within a period, the non-uniform time intervals being generated from an equidistributed sequence.

Another aspect of the disclosed embodiments is a method for encoding a plurality of frames in a video stream with temporal scalability. The method includes identifying a plurality of temporal encoding layers, each layer to include at least one frame per period, assigning one or more frames to each layer, the frames being located at one or more time values within one or more periods from an equidistributed sequence, and encoding each layer into a compressed video stream.

Another aspect of the disclosed embodiments is an apparatus for encoding a plurality of frames in a video stream with temporal scalability. The apparatus comprises a memory and at least one processor configured to execute instructions stored in the memory to: identify a non-uniform sequence of time values within a period, determine a frame corresponding to each time value in the non-uniform sequence, within at least one period, and assign each of the determined frames to one of a plurality of temporal encoding layers.

Another aspect of the disclosed embodiments is a method for transmitting an encoded video signal with temporal scalability from one or more transmitting stations to one or more receiving stations. The method includes determining a number of frames per period to be transmitted to at least one receiving station, determining a number of layers to transmit to each receiving station based on the determined number of frames per period and the number of frames per period for each layer, and transmitting the determined number of layers to each receiving station.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
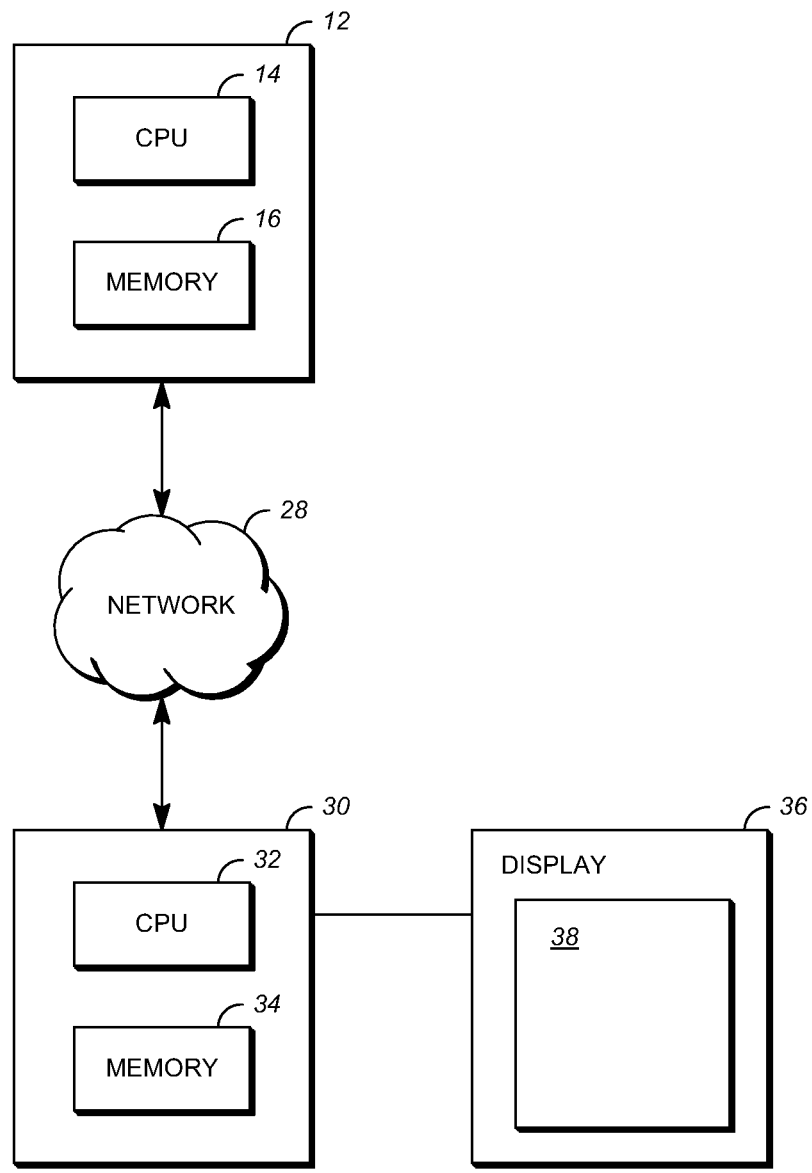
FIG. 1 is a schematic of a video encoding and decoding system.

FIG. 1 is a diagram of an encoder and decoder system 10 for still or dynamic video images. An exemplary transmitting station 12 may be, for example, a computer having an internal configuration of hardware including a processor such as a central processing unit (CPU) 14 and a memory 16. CPU 14 can be a controller for controlling the operations of transmitting station 12. The CPU 14 is connected to memory 16 by, for example, a memory bus. Memory 16 may be random access memory (RAM) or any other suitable memory device. Memory 16 can store data and program instructions which are used by the CPU 14. Other suitable implementations of transmitting station 12 are possible.

A network 28 connects transmitting station 12 and a receiving station 30 for encoding and decoding of the video stream. Specifically, the video stream can be encoded by an encoder in transmitting station 12 and the encoded video stream can be decoded by a decoder in receiving station 30. Network 28 may, for example, be the Internet. Network 28 may also be a local area network (LAN), wide area network (WAN), virtual private network (VPN), or any other means of transferring the video stream from transmitting station 12.

Receiving station 30, in one example, may be a computer having an internal configuration of hardware include a processor such as a central processing unit (CPU) 32 and a memory 34. CPU 32 is a controller for controlling the operations of receiving station 30. CPU 32 can be connected to memory 34 by, for example, a memory bus. Memory 34 may be RAM or any other suitable memory device. Memory 34 stores data and program instructions which are used by CPU 32. Other suitable implementations of receiving station 30 are possible.

A display 36 configured to display a video stream can be connected to receiving station 30. Display 36 may be implemented in various ways, including by a liquid crystal display (LCD) or a cathode-ray tube (CRT). The display 36 can be configured to display a video stream decoded by the decoder in receiving station 30.

Other implementations of the encoder and decoder system 10 are possible. For example, one implementation can omit the network 28 and/or the display 36. In another implementation, a video stream may be encoded and then stored for transmission at a later time by receiving station 12 or any other device having memory. In another implementation, additional components may be added to the encoder and decoder system 10. For example, a display or a video camera may be attached to receiving station 12 to capture the video stream to be encoded.

Figure 2:
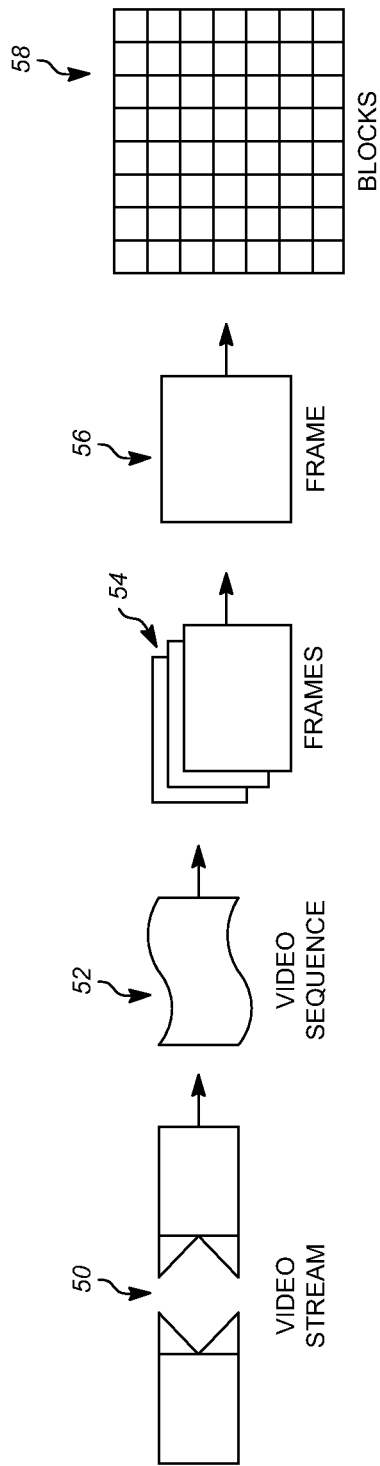
FIG. 2 is a diagram of a video bitstream.

FIG. 2 is a diagram a typical video stream 50 to be encoded and decoded. Video coding formats, such as VP8 or H.264, provide a defined hierarchy of layers for video stream 50. Video stream 50 includes a video sequence 52. At the next level, video sequence 52 consists of a number of adjacent frames 54, which can then be further subdivided into a single frame 56. At the next level, frame 56 can be divided into a series of blocks 58 (e.g. blocks), which can contain data corresponding to, for example, a 16×16 block of displayed pixels in frame 56. Each block can contain luminance and chrominance data for the corresponding pixels. Blocks 58 can also be of any other suitable size such as 16×8 pixel groups or 8×16 pixel groups.

Figure 3:
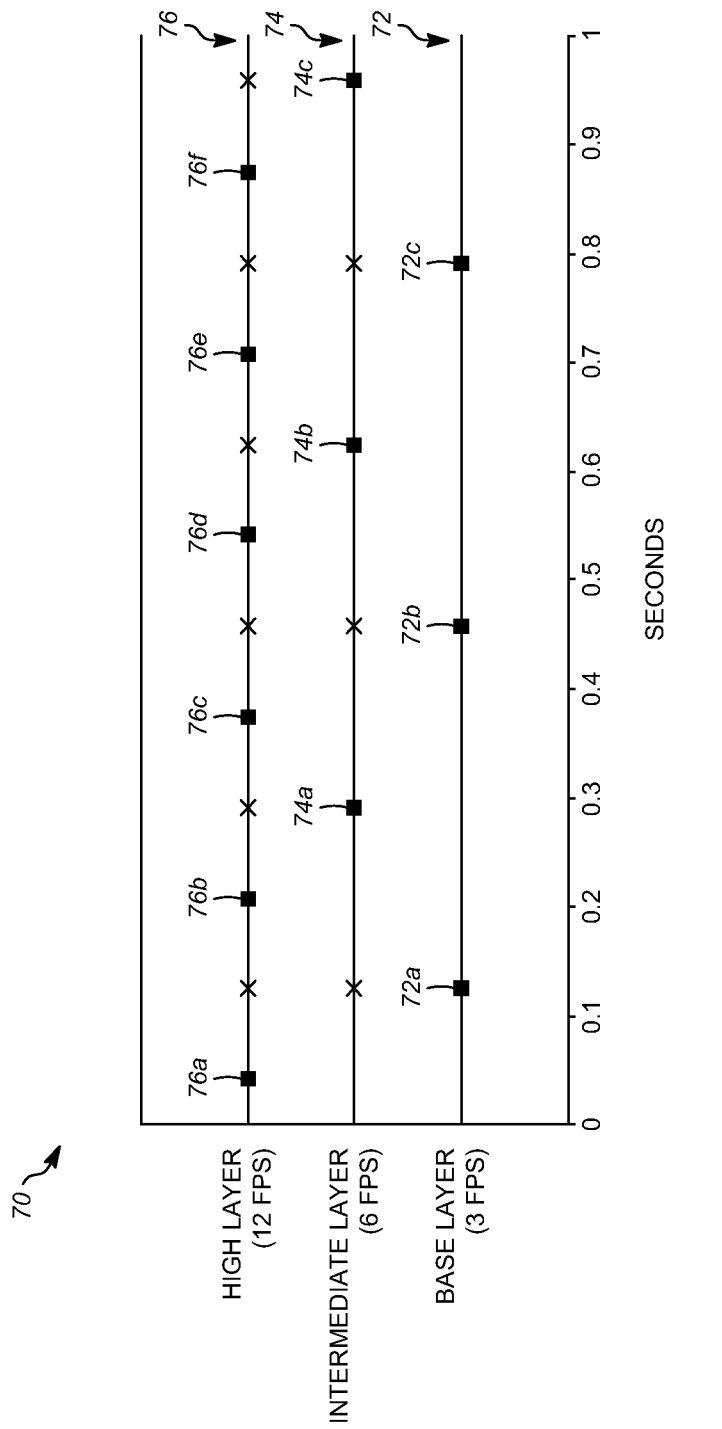
FIG. 3 is an exemplary chart of frames arranged in layers for scalable video coding.

FIG. 3 is an exemplary chart 70 of frames arranged in layers for scalable video coding. The layers include a base layer 72, intermediate layer 74, and high layer 76. Each layer contains video frames at specific time values within a period 78. The period 78 can be any length of time, but in this instance, the length of time used is one second.

Chart 70 represents an example of standard video coding, wherein every time interval between the time values of two consecutive frames is consistent. For example, base layer 72 represents a video stream encoded at three frames per second. As such, each frame included in base layer 72 is located at a time value that is $1/3$ of a second after the frame previous in time and before the frame next in time. In other words, the time interval between frames and the time value of each individual frame is uniform and is based on a set frequency.

Further, chart 70 represents an example of scalable video coding. Scalable video encoding is a way to achieve temporal scalability of video. Temporal scalability allows for the number of frames sent to or used by a receiving station per period to be dynamically adjusted without changing the encoding. In other words, a video stream can be subdivided and encoded into various layers. One of the layers can be used on its own or two or more of the layers can be combined to create a video stream with a higher number of frames per period.

In scalable video coding, each successive layer doubles the effective frame rate per period of the layers below. In this example, the layers in chart 70 allow for frame rates of three, six, or twelve frames per period (in this case, frames per second or FPS). The first layer, base layer 72, is shown with a number of frames per period of three FPS. Base layer 72 includes frames 72a, 72b, and 72c.

The next layer, intermediate layer 74, is shown with a frame rate of three FPS. Intermediate layer 74 includes frames 74a, 74b, and 74c situated at time values in between the time values of the frames in base layer 72. The effective frame rate of intermediate layer 74 is six frames per second because, when used, intermediate layer 74 is combined with base layer 72. The frames incorporated from the base layer 72 are shown as "X" symbols on the chart.

The next layer, high layer 76 is shown with a frame rate of six FPS. High layer 76 includes frames 76a-f, situated at time values in between the time values of the frames in each of the base layer 72 and intermediate layer 74. The effective frame rate of high layer 76 is twelve frames per second because, when used, high layer 76 is combined with intermediate layer 74 and base layer 72. The frames incorporated from the layers below are shown as "X" symbols on the chart.

The doubling of frame rate for each layer is a limitation of scalable video coding. The doubling of frame rate is required so that the time intervals between temporally adjacent frames in a video stream created by combining two or more layers are uniform. For example, if high layer 76 were to have three frames per period instead of six frames per period, a combination of layers including high layer 76 would have some time intervals double that of other time intervals. For example, if frame 76d were not included, the time interval between the frame before 76d (72b) and the frame after 76d (74b) would be $1/6$ of a second. At the same time, other frames in high layer 76 would have time intervals of $1/12$ of a second (i.e. between frame 74b and 76e).

Having some frames in a video stream displayed at time intervals of $1/12$ of a second and others at time intervals of $1/6$ of a second results in too great of a difference in time intervals to produce a video stream of sufficient visual quality. In other words, scalable video coding results in an exponential (i.e. non-linear) increase in the number of frames per additional layer.

Figure 4:
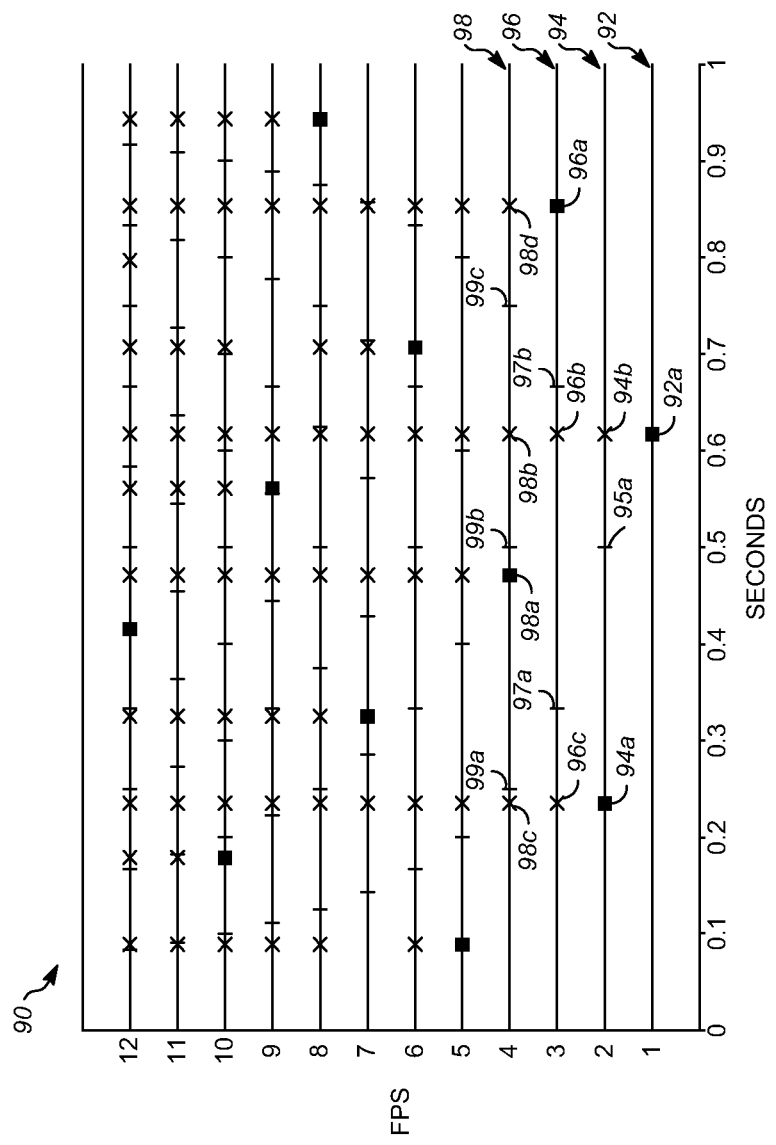
FIG. 4 is an exemplary chart of frames arranged in layers for granular scalable video coding using an equidistributed sequence of time values.

FIG. 4 is an exemplary chart 90 of frames arranged in layers for video coding with granular temporal scalability using an equidistributed sequence of time values. Granular temporal scalability allows for temporal encoding layers that increase the number of frames per layer in a linear fashion (in other words, a non-exponential increase). A sequence of real numbers $\{x_n\}$ is equidistributed over an interval if the probability of finding $x_n$ in any subinterval is proportional to the subinterval length.

In the case of encoding with granular temporal scalability, the values in the equidistributed sequence are time values. In this case, time values represent a location in time (temporal location) of a video frame. Temporally adjacent time values are separated by an amount of time called a time interval. An equidistributed sequence can also be called a non-uniform sequence (in this case, a non-uniform sequence of time values), meaning that at least some of the time intervals between various temporally adjacent time values are not equal. In other words, time intervals between adjacent time values of the non-uniform sequence within a period are non-uniform time intervals.

An equidistributed sequence can also be defined in other ways. In one definition, an interval (i.e. a period) can be subdivided equally into x subintervals. For example, an interval of 1 can be separated into uniform subintervals using the sequence: $\{1/x, 2/x, \ldots, (x-1)/x\}$. A sequence can be considered to be equidistributed if a majority of the values within a sequence of x values each fall within a single uniform interval. In another definition, the values within an equidistributed sequence as a whole do not significantly deviate from an average time interval defined by the period of the equidistributed sequence divided by the number of values within the sequence.

Equidistributed sequences can be created using known mathematical constants. For example, equidistributed sequences can be defined using the golden ratio, otherwise known as phi ($\Phi$), base of the natural logarithm (e), Euler-Mascheroni constant ($\gamma$), and pi ($\pi$). One of the more consistent equidistributed sequences is based on the golden ratio ($\phi$) and is defined as:

$$S_n = \text{frac}(n\Phi); \qquad (1)$$

wherein
$S_n$ is an equidistributed sequence generated from the golden ratio;
frac( ) is a function that returns the portion of a number after the decimal; and
n is a current index within the sequence between 1 and the number of values in the sequence.

The first twelve values of the above sequence are listed below in Table 1. The values are rounded to five decimal places. The output from the above function is listed in the column "S (Sequence Order)." The sequence in sequence order maintains the equidistributed nature of subset sequences starting with n=1. The sequence in temporal order illustrates the time values in order of time for $1 \leq n \leq 12$. In other words, in temporal order, adjacent time values are temporally adjacent, since they are in order of time. The temporal order will change based on the number of values in the sequence due to the equidistributed nature of the sequence. The temporal order of time values is the order in which a decoder will decode frames at a particular frame rate. The temporal order of time values also is illustrative of the time intervals between temporally adjacent time values for a particular sequence length.

TABLE 1

| n | S (Sequence Order) | S (Temporal Order) |
|---|---|---|
| 1 | 0.61803 | 0.09017 |
| 2 | 0.23607 | 0.18034 |
| 3 | 0.85410 | 0.23607 |
| 4 | 0.47214 | 0.32624 |
| 5 | 0.09017 | 0.41641 |
| 6 | 0.70820 | 0.47214 |
| 7 | 0.32624 | 0.56231 |
| 8 | 0.94427 | 0.61803 |

TABLE 1-continued

| n | S (Sequence Order) | S (Temporal Order) |
|---|---|---|
| 9 | 0.56231 | 0.70820 |
| 10 | 0.18034 | 0.79837 |
| 11 | 0.79837 | 0.85410 |
| 12 | 0.41641 | 0.94427 |

As mentioned, one of the characteristics of an equidistributed sequence is that subsets of the sequence are also equidistributed. Chart 90 demonstrates a method of encoding video based on this property. Chart 90 depicts twelve temporal encoding layers for one period, in this case, a period of one second. The temporal encoding layers can be described as being in a hierarchy, starting with the first layer at the top of the hierarchy, through the last layer on the bottom of the hierarchy. In other words, a layer is always combined with layers above it in the layer hierarchy. For example, the fifth layer is combined with layers 1-4 when decoded.

In this example, each temporal encoding layer contains one frame of video for the period. However, in other implementations, a layer may include more than one frame per period. Temporal encoding layers can contain additional periods containing frames as well. Video frames are determined and assigned starting with the first layer 92 at time values from the equidistributed sequence in sequence order. Subsequent layers are assigned one frame each, also in sequence order, starting with second layer 94, then third layer 96, fourth layer 98, and so on.

With respect to first layer 92, frame 92a is located at a time value approximately 0.61803 seconds into the period shown. The encoded first layer 92 can be used by a decoder to decode a video stream having a frame rate of one FPS. With respect to second layer 94, frame 94a is located at a time value approximately 0.23607 seconds into the period shown. Second layer 94 can be combined with first layer 92 to create a combined video stream having a frame rate of 2 FPS. The incorporation of frame 92a is shown as 94a in chart 90.

With respect to third layer 96, frame 96a is located at a time value approximately 0.85410 seconds into the period shown. Third layer 96 can be combined with the layers below to create a combined video stream having a frame rate of 3 FPS. The incorporation of frames 92a and 94a are shown as 96b and 96c in chart 90. With respect to fourth layer 98, frame 98a is located at a time value approximately 0.47214 seconds into the period shown. Fourth layer 98 can be combined with the layers below to create a combined video stream having a frame rate of 4 FPS. The incorporation of frames 92a, 94a, and 96a are shown as 98b-d in chart 90.

Additional layers can be added using the same process as described above with respect to first layer 92 through fourth layer 98. In particular, chart 90 demonstrates an additional eight layers for a maximum of twelve frames per period. But, additional layers and frames can be included. Temporal layers can be iteratively combined starting with the first layer and continuing with consecutively subordinate layers (i.e. layer 2, 3, 4, . . . ) to achieve practically any desired frame rate in the resulting combined layers. A number of frames between one and sixty frames per second is currently contemplated as an exemplary range. However, any number of frames and/or layers can be combined together. The frame rate of the combined layers is equal to the sum of frames included in each of the layers combined together.

While the equidistributed sequence shown includes a first frame in sequence order at 0.61803 seconds, in alternative implementations, the first frame in sequence order can be placed at an alternative point in time, for example, at the beginning of a period (0 seconds). In one implementation, this can be accomplished by subtracting from every value in the sequence the time value of the first frame (0.61803) and calculating the alternative time values by taking the subtracted values modulo 1. Other alternative periods and arrangements of the equidistributed sequence are possible.

This method of encoding of video provides the ability to incrementally increase or decrease the frame rate of transmitted video stream by combining or peeling off layers as described without any prior knowledge of the preferred or required frame rates for various receiving stations. However, the encoding may be optimized if there is sufficient statistical knowledge of the preferred or required frame rates for receiving stations that will receive the temporally scalable encoded video stream.

The equidistributed nature of a temporal encoding layer can be tested by subdividing a period into a number of uniform subintervals equal to the number of frames included in and incorporated into that layer. For example, second layer 94 can be subdivided into two intervals: {0,1/2} and {1/2,1}, as shown by hash mark 95a on chart 90. Since each frame of frames 94a and 94b are located in different subintervals, this layer is considered equidistributed using this measuring technique. Subsequent layers can be measured in a similar fashion. For example, third layer 96 can be divided into three sub intervals bounded by the values {0,1/3,2/3,1} as shown by the hash marks 97a-b. And fourth layer 98 can be divided into four sub intervals bounded by the values {0,1/4,1/2,3/4,1} as shown by the hash marks 99a-c.

Subsequent layers can be tested in a similar fashion, and hash marks are shown on chart 90 for those layers to illustrate the equidistributed nature of each layer as combined with frames in layers below. Table 2, below, shows the number of empty subintervals present for each subset of an equidistributed sequence based on the golden ratio for {1,n}. An equidistributed sequence does not require that all subsets include time values that fill every subinterval for that subset. Rather, an equidistributed sequence can fill a majority of subintervals. A sequence is more uniform when the sequence has less empty subintervals.

TABLE 2

| n | Empty Subintervals |
|---|---|
| 1 | 0 |
| 2 | 0 |
| 3 | 0 |
| 4 | 0 |
| 5 | 0 |
| 6 | 0 |
| 7 | 1 |
| 8 | 0 |
| 9 | 2 |
| 10 | 0 |
| 11 | 1 |
| 12 | 1 |

Figure 5:
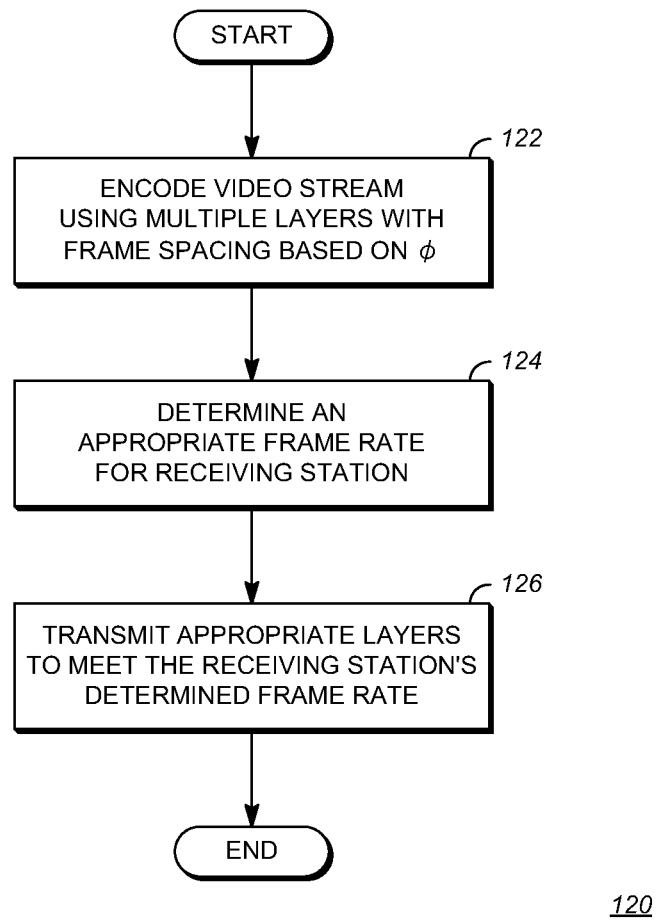
FIG. 5 is a flowchart of a method of encoding and transmitting a video stream with granular temporal scalability.

FIG. 5 is a flowchart of a method 120 of encoding and transmitting a video stream with granular temporal scalability. The method 120 can be implemented in software as an encoder on, for example, transmitting station 12. First, the encoder will encode the video stream in multiple layers with frame spacing between determined frames based on $\Phi$ (122). The frame spacing is based on an equidistributed sequence, such as the sequence described previously. Alternatively, the equidistributed sequence can be based on a value other than $\Phi$.

In another implementation, the equidistributed sequence may include arbitrary values stored in a table. The arbitrary values may or may not be based on a function-based equidistributed sequence. The arbitrary values may be optimized such that the time intervals between time values at certain identified frame rates are more consistent (i.e. more uniform) then at other frame rates.

In yet another implementation, the equidistributed sequence time values may be modified to enable transmission using the existing real-time protocol (RTP) on a network. The RTP functions by assigning data to a time index that corresponds with an agreed upon clock. For example, a video stream having 30 FPS could be transmitted using RTP with a 30 Hz clock. Each frame transmitted would include an index value corresponding to that frame's location in time based on the clock selected. For example, a value of 1 would correspond to 1/30 of a second, 2 would correspond to 2/30 of a second, and 75 would correspond to 75/30 of a second, or 2.5 seconds into the video stream.

Since a temporally scalable video stream encoded using a non-uniform sequence (i.e. equidistributed sequence) includes frames encoded at non-uniform time intervals, a clock set at a frequency corresponding to the number of frames per period would not properly function (i.e. 12 Hz with respect to chart 90). To interoperate with the standard RTP protocol, a high-frequency clock can be used instead, for example 10 kHz. The equidistributed sequence time values can be rounded to the nearest time value on the selected high-frequency clock. Using the example of 10 kHz, the first value in the equidistributed sequence in Table 1 (0.61803) can be rounded to 0.6180. In this example, this time value, if located in the first period of the video stream, could be encoded using RTP with an index of 6,180. With this method, a large number of time indexes will remain unused; however, compliance with the RTP standard will be maintained.

Alternatively, the RTP standard protocol could be modified to enable transmission based on a clock other than a frequency based clock. For example, in one implementation, the protocol could be expanded to allow for a clock based on the golden ratio or other equidistributed sequence. Such a clock can include a period length of time and an equidistributed sequence length. Time indexes can then correspond to a time value in the equidistributed sequence and would be rendered temporally based on that time value. For example, given a period length of one second and the equidistributed sequence of Table 1 (with a sequence length of 12), an index value of 13 would result in a frame being located 1.61803 seconds into the video stream.

The method 120 can encode in layers as described with respect to FIG. 4 or may use alternative layer encoding methods. For example, one or more layers may include two or more frames. Other implementations may also be used.

At this stage, the method for determining frames for various time values is considered. If the encoder is directly capturing the video stream for encoding, it may be possible for the encoder to capture video at time values directed towards the time values of the equidistributed sequence being used. However, the encoder may not be able to control the time values and time intervals of the video stream to be encoded and may have to encode, for example, a video stream at a set frame rate, for example, 30 FPS into the encoded video stream with frames at non-uniform intervals.

In such an instance, the encoder may determine the frames for each time value in the encoded video stream in many different ways, depending on the implementation. In one example, the encoder can choose the frame in the input video stream that is closest to the time value requiring a frame for encoding. Alternately, other methods may be used. For example, if a time value exists between the time values of two frames in the input video stream, those two frames may be used together, for example, using a blur, to create the frame to be encoded. These are only two exemplary ways of determining frames for time values in an equidistributed sequence, and implementations may use various methods to determine frames for the output video stream that similar or dissimilar to those discussed.

Once the video stream is encoded into multiple temporal encoding layers, the encoder or transmitting station 12 will determine an appropriate frame rate for one or more receiving stations (124). The appropriate frame rate may be determined based on information provided by the client or it may be determined based on network conditions and other information not including a specific frame rate request from the receiving station. The appropriate frame rate for a receiving station is generally based on the receiving station's available bandwidth.

One way of determining frame rate from a receiving station would be for the receiving station to determine the available bandwidth for the video stream being sent to that receiving station. The receiving station can then send the available bandwidth (i.e. bitrate) to the transmitting station, or the receiving station can determine a number of frames per second to request. Factors other than bandwidth can be considered by the receiving station. For example, computational ability of the receiving station may be considered.

Alternatively, the transmitting station can determine optimal frames per second for a receiving station based on dropped packets of a video stream being sent to the receiving station. In this example, the transmitting station can measure an approximate bandwidth capability (and consequently a number of frames per second that can be sent within that bandwidth) of the receiving station.

Once the frame rate for a receiving station is determined, appropriate temporal encoding layers are transmitted to the receiving station to meet the determined frame rate (126). The appropriate temporal encoding layers are determined based on the determined frame rate and the number of frames in the temporal encoding layers. Using chart 90 above, if, for example, a receiving station had a determined frame rate of 8 FPS, the first eight layers (1-8) would be transmitted to that receiving station. If another receiving station had a determined frame rate of 11 FPS, the first eleven layers (1-11) would be transmitted to that other receiving station.

The process of encoding using non-uniform time intervals may be incorporated into existing video encoding schemes, such as those discussed previously. Such incorporation can include the encoding of video into multiple temporal encoding layers in order to achieve temporal scalability. In one implementation, granular temporal scalability can be achieved by encoding one frame per period into each temporal encoding layer. However, temporal encoding layers are not required, and video may be encoded at non-uniform time intervals without the use of temporal encoding layers.

The above-described embodiments of encoding or decoding may illustrate some exemplary encoding techniques. However, in general, encoding and decoding as those terms are used in the claims are understood to mean compression, decompression, transformation or any other change to data whatsoever.

The embodiments of transmitting station 12 and/or receiving station 30 (and the algorithms, methods, instructions etc. stored thereon and/or executed thereby) can be realized in hardware, software, or any combination thereof including, for example, IP cores, ASICS, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a handheld communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 30 implementation schemes are available. For example, receiving station 30 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a plurality of frames in a video stream with temporal scalability, the method comprising:
   identifying a plurality of temporal encoding layers, each layer to include at least one frame per period;
   assigning one or more frames to each layer, each frame being located within a period at a time value determined using an equidistributed sequence wherein the equidistributed sequence is generated using the steps of:
   determining a plurality of bandwidths for a plurality of receiving stations,
   determining a plurality of frame rates per period to achieve the plurality of bandwidths, and
   optimizing the equidistributed sequence to increase the uniformity of time intervals of a plurality of subsets of the sequence corresponding to the determined plurality of frame rates per period; and encoding each temporal encoding layer into a compressed video stream using a processor.

2. The method of claim 1, wherein the period is equal to one second.

3. The method of claim 1, wherein each layer includes a number of frames such that an iterative combination of layers, starting with a first layer, results in a non-exponential increase in the number of frames in each layer.

4. The method of claim 1, wherein the plurality of layers are arranged in a hierarchical manner.

5. The method of claim 4, wherein a first layer in the hierarchy of the plurality of layers can be combined with one or more consecutively subordinate layers such that the frames in the combined layers are equidistributed.

6. The method of claim 5, wherein each layer is assigned a number of frames in order to achieve, at minimum, a plurality of identified frame rates per period for a set including the first layer in the hierarchy of the plurality of layers and combinations of layers including the first layer and one or more of the consecutively subordinate layers.

7. The method of claim 4, wherein assigning the one or more frames to each layer comprises:
assigning at least one frame to a first layer in the hierarchy of the plurality of layers, each frame being located at a first time value within the period based on one or more first values in the equidistributed sequence; and
assigning other frames to subsequent layers in order of the hierarchy of the plurality of layers, the other frames being located at subsequent time values within the period based on values of the equidistributed sequence in sequence after the one or more first values.

8. The method of claim 1, wherein the equidistributed sequence is based on one of phi or e, wherein phi is the golden ratio and e is the base of the natural logarithm.

9. The method of claim 1, wherein the equidistributed sequence is stored in a table and the equidistributed sequence is a modification of a sequence based on one of phi or e, wherein phi is the golden ratio and e is the base of the natural logarithm.

10. An apparatus for encoding a plurality of frames in a video stream with temporal scalability, the apparatus comprising:
a memory; and
a processor configured to execute instructions stored in the memory to:
identify a non-uniform sequence of time values within a period using an equidistributed sequence defined by $S_n$=frac(n$\Phi$), wherein $S_n$ is an equidistributed sequence generated from the golden ratio, frac( ) is a function that returns the portion of a number after the decimal, n is a current index within the sequence between 1 and the number of values in the sequence, and $\Phi$ is the golden ratio;
determine a frame corresponding to each time value in the non-uniform sequence, within at least one period; and
assign each of the determined frames to one of a plurality of temporal encoding layers.

11. The apparatus of claim 10, wherein the period is equal to one second.

12. The apparatus of claim 10, wherein each layer from the plurality of layers includes a number of frames such that an iterative combination of layers, starting with a first layer, results in a non-exponential increase in the number of frames in each layer.

13. The apparatus of claim 10, wherein the plurality of layers are arranged in a hierarchical manner.

14. The apparatus of claim 13, wherein a first layer in the hierarchy of the plurality of layers can be combined with one or more consecutively subordinate layers such that the frames in the combined layers are equidistributed.

15. The apparatus of claim 14, wherein each layer is assigned a number of frames in order to achieve, at minimum, a plurality of identified frame rates per period for a set including the first layer in the hierarchy of the plurality of layers and combinations of layers including the first layer and one or more of the consecutively subordinate layers.

16. The apparatus of claim 13, wherein the processor assigns each of the determined frames to one of a plurality of temporal encoding layers by
assigning at least one frame to a first layer in the hierarchy of the plurality of layers, each frame being located at a first time value within the period based on one or more first values in the equidistributed sequence; and
assigning other frames to subsequent layers in order of the hierarchy of the plurality of layers, the other frames being located at subsequent time values within the period based on values of the equidistributed sequence in sequence after the one or more first values.

17. A method for encoding a plurality of frames in a video stream with temporal scalability, the method comprising:
identifying a non-uniform sequence of time values within a period using an equidistributed sequence defined by $S_n$=frac(n$\Phi$), wherein $S_n$ is an equidistributed sequence generated from the golden ratio, frac( ) is a function that returns the portion of a number after the decimal, n is a current index within the sequence between 1 and the number of values in the sequence, and $\Phi$ is the golden ratio;
determining a frame corresponding to each time value in the non-uniform sequence, within at least one period; and
assigning each of the determined frames to one of a plurality of temporal encoding layers.

18. The method of claim 17, wherein the period is equal to one second.

19. The method of claim 17, wherein each layer from the plurality of layers includes a number of frames such that an iterative combination of layers, starting with a first layer, results in a non-exponential increase in the number of frames in each layer.

20. The method of claim 17, wherein the plurality of layers are arranged in a hierarchical manner.

21. The method of claim 20, wherein a first layer in the hierarchy of the plurality of layers can be combined with one or more consecutively subordinate layers such that the frames in the combined layers are equidistributed.

22. The method of claim 21, wherein each layer is assigned a number of frames in order to achieve, at minimum, a plurality of identified frame rates per period for a set including the first layer in the hierarchy of the plurality of layers and combinations of layers including the first layer and one or more of the consecutively subordinate layers.

23. The method of claim 20, wherein assigning each of the determined frames to one of a plurality of temporal encoding layers includes:
assigning at least one frame to a first layer in the hierarchy of the plurality of layers, each frame being located at a first time value within the period based on one or more first values in the equidistributed sequence; and
assigning other frames to subsequent layers in order of the hierarchy of the plurality of layers, the other frames being located at subsequent time values within the period based on values of the equidistributed sequence in sequence after the one or more first values.

* * * * *